UNITED STATES PATENT OFFICE.

FREDERIC DIXON, OF LONDON, ENGLAND.

IMPROVEMENT IN PROCESSES OF TREATING WOOD.

Specification forming part of Letters Patent No. 181,651, dated August 29, 1876; application filed June 6, 1876.

*To all whom it may concern:*

Be it known that I, FREDERIC DIXON, of 20 Charterhouse Square, in the city of London, England, analytical chemist, a subject of the Queen of Great Britain, have invented or discovered new and useful improvements in the treatment of wood casks or vessels, or staves thereof, for the storing and preservation of beer, wine, spirits, and other liquids, part of which improvements is also applicable to the preservation of animal and vegetable substances; and I, the said FREDERIC DIXON, do hereby declare the nature of the said invention, and in what manner the same is to be performed, to be particularly described and ascertained in and by the following statement thereof—that is to say:

In the employment of wood casks or vessels for the storing of beer, wine, and other liquids, the extractive matter, such as "tannin," contained in the wood has an injurious effect on the liquid contained therein. In order to remedy this evil I immerse the stays to form the casks or vessels in a highly-heated solution of hydrochloric or sulphuric acid, say to a temperature of about 212° Fahrenheit, in order to remove sufficient of such extractive matter contained in them, and thereby to prevent such extractive matter from causing secondary fermentation in beer, wine, or other liquid contained in casks or vessels formed of such staves; or, when treating new wood casks or vessels, I, in some cases, pour therein a solution of hydrochloric or sulphuric acid, either hot or cold, and this solution is allowed to remain therein until a sufficient quantity of the matter to be extracted from the wood has become removed from it.

The proportion of either acid I find to answer well is about one part of acid to five hundred parts of water, retained in the cask or vessel for about twenty minutes, but these proportions and the time may be varied.

Into wood casks or vessels to contain beer or other liquids made of staves thus treated, I pour a saturated boiling solution of salicylic acid of, say, half an ounce of salicylic acid to ten ounces of boiling water, and add one ounce of bisulphite of soda to neutralize the hydrochloric or sulphuric acid used in the previous process, and the cask or vessel is agitated so as to bring all parts into contact with the solution.

In some cases I combine with the bisulphide of soda also other bisulphite or bisulphites, as, for instance, bisulphite of lime, or magnesia, or potash, or bisulphite of lime combined with magnesia or potash. These proportions have reference to a cask to contain, say, fifty gallons, but are capable of variation, dependent on the condition of the water, the weather, the wood, and other circumstances. When cold, the residuum may be removed from the cask or vessel, leaving the larger proportion of the salicylic acid and bisulphite or bisulphites behind, in combination with the acid previously absorbed by the cask-staves.

When treating casks or vessels or staves to be formed into such vessels to contain wine, spirits, or similar liquids, instead of bisulphite of soda, I add other bisulphite or bisulphites, as bisulphite of potash or lime, to the salicylic-acid solution.

By thus treating staves and casks or vessels to contain beer, wine, or other liquids, I am enabled to prevent or arrest the formation of aldehyde or acetic, or such like fermentation, or further oxidation of the alcohol in the beer, wine, or other liquids contained therein.

I also treat wood casks or vessels that have been used to contain beer, wine, spirits, or other similar liquids, after cleansing in an ordinary manner, with a solution of salicylic acid and a bisulphite or bisulphites, as before described, in order to arrest or prevent the formation of fungus or decay of the wood.

In some cases it will be sufficient to treat the wood casks or vessels intended to be stored empty with a cold solution of salicylic acid and a bisulphite or bisulphites.

Wood casks or vessels for containing vinegar I first operate upon for the removal of the extractive matter referred to by the use of the solution of the sulphuric acid alone. I then apply to the contained vinegar a small quantity of salicylic acid in a state of solution, and in about the proportion stated of that for beer and other liquids.

When the vinegar so applied contains about sixteen per centum of acetic acid, I apply about one-half of an ounce of salicylic acid to fifty gallons of such vinegar, and I increase the proportion of salicylic acid employed when the vinegar so stored is of a lower standard, reducing it for the higher classes.

In order to effect the preservation of animal and vegetable substances, I immerse such substances in a saturated solution of salicylic acid, to which, in order to promote saturation, has been added a small quantity of chloride of sodium.

When it is desired further to increase the solubility of the salicylic acid, I add to the solution a small quantity of glycerine, either in substitution of or addition to the chloride of sodium.

Having thus described my invention, and means which I adopt in carrying the same into effect, I would have it understood that what I claim is—

The process for treating wood, casks, or vessels, or the staves thereof, which consists in treating such, first, with a solution of hydrochloric or sulphuric acid; and, secondly, with a saturated solution of salicylic acid and bisulphite of soda, or other bisulphite or bisulphites, in the manner and for the purposes as hereinbefore described, said solutions being made in the proportions or about the proportions specified.

FREDERIC DIXON.

Witnesses:
CHARLES BARLOW,
23 *Southampton Buildings, London,*
*Patent Agent.*
H. E. B. MENCE,
23 *Southampton Buildings, London.*